(12) United States Patent
Shih et al.

(10) Patent No.: US 12,510,710 B2
(45) Date of Patent: Dec. 30, 2025

(54) METHOD FOR FORMING OPTICAL WAVEGUIDE STRUCTURE

(71) Applicant: TAIWAN SEMICONDUCTOR MANUFACTURING COMPANY LTD., Hsinchu (TW)

(72) Inventors: Chih-Tsung Shih, Hsinchu (TW); Hau-Yan Lu, Hsinchu (TW); Wei-Kang Liu, Taichung (TW); Yingkit Felix Tsui, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 18/673,366

(22) Filed: May 24, 2024

(65) Prior Publication Data

US 2024/0310579 A1    Sep. 19, 2024

Related U.S. Application Data

(62) Division of application No. 17/817,032, filed on Aug. 3, 2022, now Pat. No. 12,025,835.

(51) Int. Cl.
| | |
|---|---|
| G02B 6/13 | (2006.01) |
| G02B 6/122 | (2006.01) |
| G02B 6/132 | (2006.01) |
| G02B 6/12 | (2006.01) |

(52) U.S. Cl.
CPC .......... *G02B 6/132* (2013.01); *G02B 6/1223* (2013.01); *G02B 2006/12061* (2013.01)

(58) Field of Classification Search
CPC .................. G02B 6/132; G02B 6/1223; G02B 2006/12061
USPC ........................................................... 385/14
See application file for complete search history.

(56) References Cited

FOREIGN PATENT DOCUMENTS

JP       2004273906 A  *  9/2004  ............. B82Y 20/00

* cited by examiner

*Primary Examiner* — Jerry M Blevins
(74) *Attorney, Agent, or Firm* — WPAT LAW; Anthony King

(57) ABSTRACT

A method for forming an optical waveguide structure includes following operations. A substrate is received. A semiconductor layer is formed on the substrate. The semiconductor layer is patterned to form at least a waveguide in the substrate and at least a trench in the semiconductor layer. A first gap-filling operation is performed to form a first dielectric portion in the trench. A second gap-filling operation is performed to form a second dielectric portion over the first dielectric portion. An air seam is sealed within the second dielectric portion. A third gap-filling operation is performed to form a third dielectric portion over the second dielectric portion.

20 Claims, 6 Drawing Sheets

METHOD FOR FORMING OPTICAL WAVEGUIDE STRUCTURE

PRIORITY CLAIM AND CROSS-REFERENCE

This patent is a divisional application of U.S. patent application Ser. No. 17/817,032 filed on Aug. 3, 2022, entitled of "OPTICAL WAVEGUIDE STRUCTURE AND METHOD FOR FORMING THE SAME", which is incorporated by reference in its entirety.

BACKGROUND

Optical signals are usable for high speed and secure data transmission between two devices. In some applications, a device capable of optical data transmission includes at least an integrated circuit (IC or "chip") having a laser die for transmitting and/or receiving optical signals. Also, the device usually has one or more other optical or electrical components, a waveguide for the transmission of the optical signals, and a support, such as a substrate of a printed circuit board, on which the chip equipped with the laser die and the one or more other components are mounted. Various approaches for mounting a chip equipped with a laser die on a substrate have been studied.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION OF THE DISCLOSURE

Figure 2:
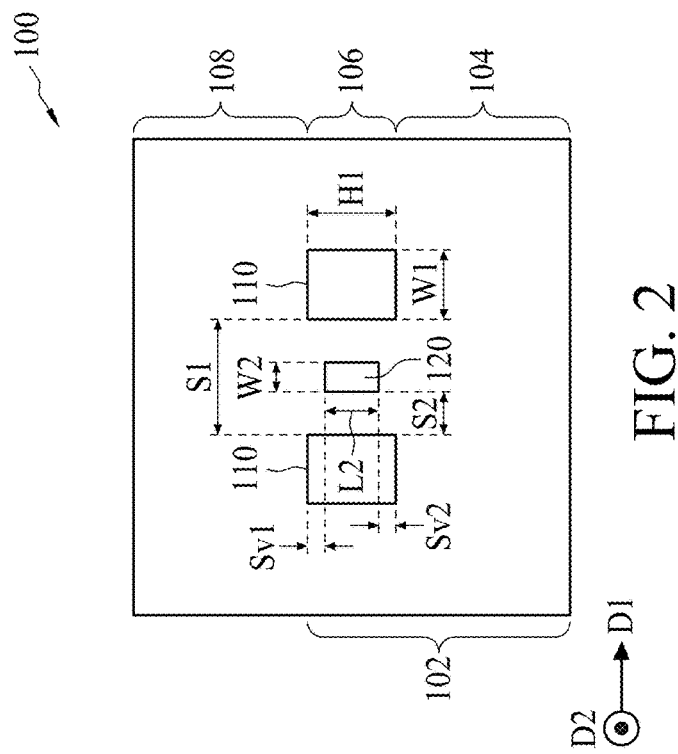
FIG. 2 shows a cross-sectional view taken along line I-I' of FIG. 1.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Silicon photonics has received much attention in recent years due to its compatibility with complementary metal-oxide-semiconductor (CMOS) technology, which makes mass production of photonics devices cost-effective. An optical waveguide is a physical structure that guides electromagnetic waves have wavelengths within the optical spectrum. An optical waveguide is often used as a component in integrated optical circuit that integrates multiple photonic functions. The integrated optical waveguide is used to confine light from a first point to a second point with minimal attenuation.

In addition, silicon photonics holds promise for low-cost, large-scale integration of photonic components. Demand for increasing density of the photonic components has led to a multitude of technological challenges in manufacture and operation of the photonic component. In some embodiments, the integrated optical waveguides, which are a ubiquitous component in silicon photonics, may be arranged in a periodic array. Therefore, one major obstacle is an amount of crosstalk or power coupling between adjacent optical waveguides, which is the sum of light in one waveguide coupled from neighboring waveguides. Crosstalk can become profound when a distance between adjacent waveguides is less than a wavelength (λ) of light propagating through such waveguides.

In some comparative approaches, for low-index contrast waveguides, such as a silicon nitride waveguide, a spacing distance between adjacent waveguides is increased to avoid the above-mentioned power coupling/crosstalk between the adjacent waveguides. In such approaches, a photonic integrated circuit (PIC) may suffer from a greater layout area.

The present disclosure therefore provides an optical waveguide structure that include an air seam/void between adjacent waveguides, thus reducing a spacing distance between the adjacent waveguides. In some embodiments, a layout area may be reduced at least 50% due to the air seams. The present disclosure also provides a method for forming a waveguide structure having an air seam between adjacent waveguides. The method provides operations compatible with CMOS manufacturing operations and an ability to conduct post-processing on CMOS wafers that contain CMOS imagers or electrical circuits.

Figure 1:
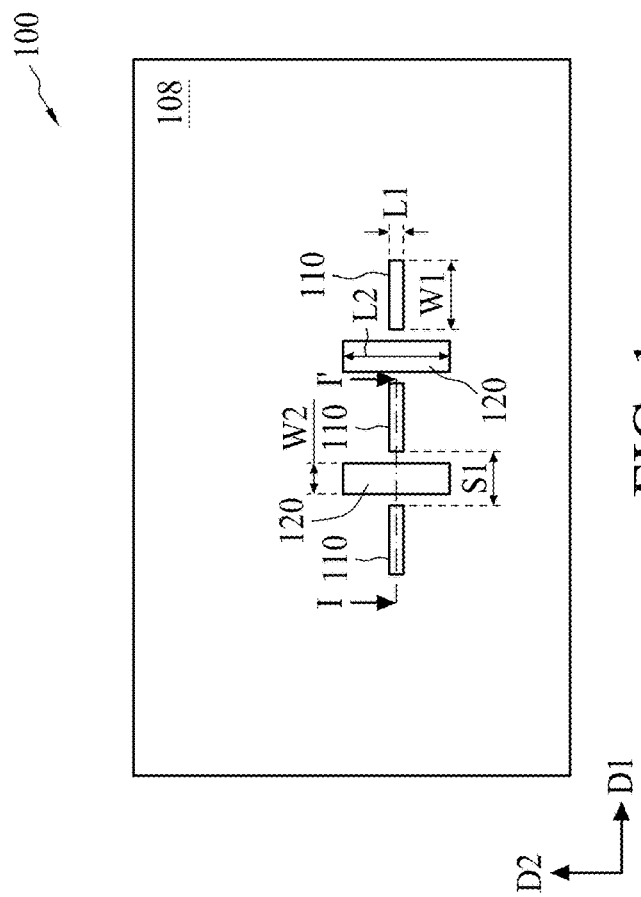
FIG. 1 shows a plane view of an optical waveguide structure in accordance with some embodiments of the present disclosure.

Referring to FIGS. 1 and 2, an optical waveguide structure 100 is provided. In some embodiments, the optical wave structure 100 includes a substrate and a plurality of semiconductor waveguides 110 disposed over the substrate. In some embodiments, the substrate may be a silicon-on-insulator (SOI) substrate 102, and the semiconductor waveguides 110 include a silicon waveguide. In the SOI substrate 102, a silicon layer is patterned to form the semiconductor waveguides 110, wherein the semiconductor waveguide 110 functions as a core on top of a buried dielectric layer 104 (i.e., a buried silicon oxide layer), and the buried dielectric layer 104 functions as a cladding layer. A dielectric layer 106 may be disposed to surround the semiconductor waveguides 110, as shown in FIG. 2. The dielectric layer 106 may be a silicon oxide layer that serves as another cladding layer. A dielectric layer 108 may be disposed to cover the semiconductor waveguides 110 and the dielectric layer 106, as shown in FIG. 2. The dielectric layer 108 may be a silicon oxide layer that serves as another cladding layer. In other words, the semiconductor waveguides 110 are entirely embedded within a first cladding layer 104, a second cladding layer 106 and a third cladding layer 108. In some embodiments, the first cladding layer 104, the second cladding layer 106 and the third cladding layer 108 may include a same material, but the disclosure is not limited thereto.

In some embodiments, where the semiconductor waveguides 110 are silicon waveguides, the refractive index of the semiconductor waveguides 110 is between about 3.3 and about 3.7. Other refractive indices of the semiconductor waveguide 110 are within the scope of the present disclosure. At least one of the semiconductor waveguide 110 or the material surrounding the semiconductor waveguide 110 is configured to guide an optical signal into or through the semiconductor waveguide 110. A refractive index of the first and second cladding layers 104 and 106 surrounding the semiconductor waveguides 110 is less than a refractive index of the semiconductor waveguides 110. For example, a refractive index of the silicon layer and a refractive index of the silicon oxide layer (e.g., a silicon dioxide layer) are 3.476 and 1.444 for 1550 nm wavelength, respectively. The first cladding layer 104, the second cladding layer 106 and the third cladding layer 108 together provide for at least some of the optical signal being reflected by a material surrounding the semiconductor waveguides 110 such that the optical signal remains within the semiconductor waveguides 110 or is inhibited from exiting the semiconductor waveguides 110 so as to be propagated via the semiconductor waveguides 110.

Other advantages provided by the present disclosure include CMOS compatibility and a high index contrast waveguide which makes a smaller bend, i.e., has a compact footprint. Due to high integration density, silicon is capable of supporting multiple functionalities on a single chip. The compact footprint increases a number of chips per wafer, which reduces a cost of a single chip.

Still referring to FIGS. 1 and 2, the optical waveguide structure 100 further includes a plurality of optical isolation structures 120, such as air seams. The optical isolation structures 120 and the semiconductor waveguides 110 are alternately and periodically arranged. Further, each of the optical isolation structures 120 is disposed between two adjacent semiconductor waveguides 110. The optical isolation structures (i.e., the air seams) 120 are separated from the semiconductor waveguides 110. Further, the air seams 120 are sealed within the second dielectric layer 106.

As shown in FIG. 1, in some embodiments, the semiconductor waveguides 110 extend along a first direction D1. In some embodiments, the semiconductor waveguides 110 may be aligned along the first direction D1. In some embodiments, the semiconductor waveguides 110 are aligned along a second direction D2, which can be perpendicular to the first direction D1. However, arrangements of the semiconductor waveguides 110 may be modified depending on various product designs.

The air seams 120 may extend along the second direction D2, and arranged along the first direction D1. Further, the air seams 120 are disposed between two adjacent semiconductor waveguides 110. That is, when an amount of the semiconductor waveguides 110 is n, an amount of the optical isolation structures (air seams) 120 is n−1.

Widths W1 of the semiconductor waveguides 110 are the same, and widths W2 of the air seams 120 are the same. Further, the width W1 of the semiconductor waveguides 110 is greater than the width W2 of the air seams 120. In some embodiments, when the air seam 120 includes other configurations, for example but not limited thereto, a teardrop shape, the width W2 is measured from a widest portion of such shape. Lengths L1 of the semiconductor waveguides 110 are the same, and lengths L2 of the air seams 120 are equal. Further, the length L2 of the air seams 120 may be greater than the length L1 of the semiconductor waveguides 110, but the disclosure is not limited thereto. Heights H1 of the semiconductor waveguides 110 are equal, and heights H2 of each air seams 120 are equal. Further, the height H1 of the semiconductor waveguides 110 is greater than the height H2 of the air seams 120. In some embodiments, the height H2 of the air seams 120 is greater than one half of the heights H1 of the semiconductor waveguides 110, and less than two times the height H1 of the semiconductor waveguides 110.

Any two adjacent semiconductor waveguides 110 are separated from each other by a spacing distance S1. The spacing distance S1 is less than the width W1 of the semiconductor waveguides 110, and greater than the width W2 of the air seams 120. In some embodiments, the spacing distance S1 is less than approximately 2 micrometers (μm), but the disclosure is not limited thereto. A spacing distance S2 is defined between a sidewall of the air seam 120 to a sidewall of its adjacent semiconductor waveguide 110, as shown in FIG. 2. The spacing distances S2 between any sidewall of the air seam 120 and the sidewall of the adjacent semiconductor wave 110 are the same. Further, the spacing distance S2 is less than the spacing distance S1.

Still referring to FIG. 2, top surfaces of the semiconductor waveguides 110 are aligned with each other, and bottom surfaces of the semiconductor waveguides 110 are aligned with each other. In some embodiments, top surfaces of the air seams 120 are aligned with each other, and bottom surfaces of the air seams 120 are aligned with each other, but the disclosure is not limited thereto. The top surfaces of the air seams 120 are lower than the top surfaces of the semiconductor waveguides 110, and the bottom surfaces of the air seams 120 are higher than the bottom surfaces of the semiconductor waveguides 110. A vertical distance Sv1 is defined between the top surface of the air seam 110 and the top surface of the semiconductor waveguide 110, and a vertical distance Sv2 is defined between the bottom surface of the air seam 120 and the bottom surface of the semiconductor waveguide 110. In some embodiments, the vertical distance Sv1 and the vertical distance Sv2 are equal.

According the optical waveguide structure 100 of the present disclosure, the optical isolation structures 120 are disposed between adjacent pairs of the semiconductor waveguides 110. The optical isolation structures 120 may include materials having a refractive index less than a refractive index of a material of the semiconductor waveguides 110 and less than a refractive index of the cladding layers 106. For example, the optical isolation structures 120 may be the air seams. Because a refractive index of air is approximately 1, the air seams 120 help reduce power coupling and noise between the adjacent two semiconductor waveguides 110. Further, because the air seams 120 reduce power coupling, a spacing distance between the adjacent two semiconductor waveguides 110 is reduced. In some comparative approaches, the spacing distance between the adjacent two semiconductor waveguides 110 have to be greater than the width W1 of the semiconductor waveguides 110 such that the power coupling is mitigated. In contrast to the comparative approaches, the spacing distance S1 between the adjacent two semiconductor waveguides 110 is reduced to less than the width W1 of the semiconductor waveguides 110 due to the air seam 120.

In some embodiments, the optical waveguide structure 100 can be integrated with a semiconductor device such as a photonic die. Please refer to FIG. 3, which is a schematic drawing of a photonic device 200 including the integrated optical waveguide structure 100. It should be noted that the photonic device 200 shown in FIG. 3 is only an example, and that those skilled in the art can easily realize that the optical waveguide structure 100 can be integrated with another semiconductor structure, device or package.

Figure 3:
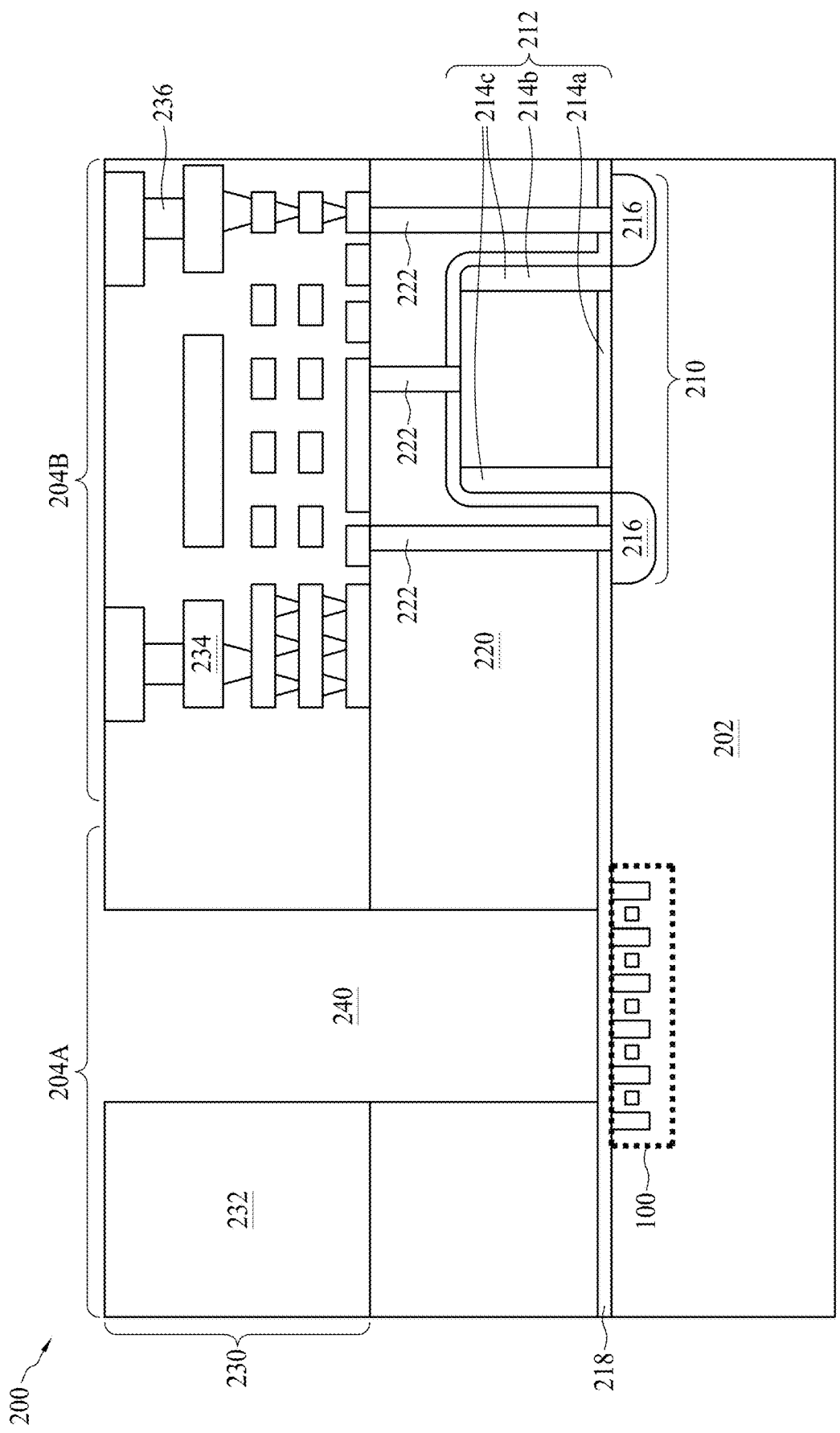
FIG. 3 shows a schematic view of a semiconductor structure comprising an optical waveguide in accordance with some embodiments of the present disclosure.

Referring to FIG. 3, in some embodiments, the photonic device 200 includes a substrate 202, such as a semiconductor substrate. The substrate 202 may be a bulk silicon substrate. Alternatively, the substrate 202 may be comprised of an elementary semiconductor, such as silicon or germanium in a crystalline structure; a compound semiconductor, such as silicon germanium, silicon carbide, gallium arsenic, gallium phosphide, indium phosphide, indium arsenide, and/or indium antimonide; or combinations thereof. The substrate 202 may also include a silicon-on-insulator (SOI) substrate. SOI substrates are fabricated using separation by implantation of oxygen (SIMOX), wafer bonding, and/or other suitable methods. Some exemplary substrate 202 includes an insulator layer. The insulator layer may be comprised of any suitable material, including silicon oxide, sapphire, other suitable insulating materials, or combinations thereof. An exemplary insulator layer may be a buried oxide layer (BOX). The insulator may be formed by any suitable process, such as implantation (e.g., SIMOX), oxidation, deposition, and/or other suitable process. In some embodiments, the insulator layer of the SOI substrate may be the buried dielectric layer 104 shown in FIG. 2, but the disclosure is not limited thereto.

The substrate 202 may include various doped regions depending on design requirements as known in the art (e.g., p-type wells or n-type wells). The doped regions are doped with p-type dopants, such as boron or BF2; n-type dopants, such as phosphorus or arsenic; or combinations thereof. The doped regions may be formed directly on the substrate 202, in a P-well structure, in an N-well structure, in a dual-well structure, or using a raised structure. The substrate 202 may further include various active regions, such as regions configured for an N-type metal-oxide-semiconductor transistor device and regions configured for a P-type metal-oxide-semiconductor transistor device.

In some embodiments, the substrate 202 may include a waveguide region 204A and a logic region 204B. The waveguide region 204A includes an optical waveguide structure 100 while the logic region 204A includes at least a circuit component. In the exemplary embodiment, the circuit component in the logic region 204B is depicted as a field-effect transistor (FET) device 210. The FET device 210 includes a gate structure 212 and source/drain regions 216. The source/drain regions 216 may refer to a source or a drain, individually or collectively, depending upon the context.

The gate structure 212 includes a gate dielectric layer 214a, a gate electrode 214b over the gate dielectric layer 214a, and a spacer 214c over sidewalls of the gate structure 212. In some embodiments, the gate electrode 214b of the FET device 210 may include a semiconductor material layer, such as a polysilicon layer. In some embodiments, a dielectric layer and a semiconductor material layer (i.e., a doped or undoped polysilicon layer) are sequentially formed over the substrate 202. A patterning operation using a patterned photoresist and a patterned hard mask is then performed on the semiconductor material layer and the dielectric layer, thereby simultaneously forming the gate dielectric layer 214a and the gate electrode 214b of the gate structure 212 over the substrate 202.

In some embodiments, the spacer 214c is made of silicon nitride (SiN), silicon carbide (SiC), SiO, silicon oxynitride (SiON), silicon carbon or another suitable material, but the disclosure is not limited thereto. In some embodiments, the spacer 214c is formed by deposition and etching-back operations.

In some embodiments, the source/drain regions 216 may be formed by forming recesses in the substrate 202 and growing a strained material in the recesses by an epitaxial (epi) process. In addition, a lattice constant of the strained material may be different from a lattice constant of the substrate 202. Accordingly, the source/drain regions 216 may have stressors that improve carrier mobility. In some embodiments, Ge, SiGe, InAs, InGaAs, InSb, GaSb, InAlP, InP, SiP, or a combination thereof, can be used to form the source/drain regions 216, depending on whether the FET device 210 is a p-type FET device or an n-type FET device. For example, SiGe may be used to form the source/drain regions of the PFET device, while SiP is used to form the source/drain regions of the NFET device.

Forming of the gate structure 210 and the source/drain regions 216 is familiar to those skilled in front-end-of-line (FEOL) approaches; therefore, such details are omitted in the interest of brevity.

In some embodiments, a contact etch stop layer (CESL) 218 is blanketly deposited over the substrate 202. The CESL 218 may cover the substrate 202 and the FET device 210. In some embodiments, the photonic device 200 includes an interlayer dielectric (ILD) layer 220 over the CESL 218. In some embodiments, conductive structures 222, which are referred to as contact plugs, are formed. As shown in FIG. 3, the conductive structures 222 penetrate the ILD layer 220 and the CESL 218, thereby contacting the gate electrode 214b and the source/drain regions 216.

Forming of the CESL 218, the ILD layer 220 and the conductive structures 222 is familiar to those skilled in middle-end-of-line (MEOL) approaches; therefore, such details are omitted in the interest of brevity.

The photonic device 200 further includes a back-end-of-line (BEOL) interconnect structure 230 disposed over the substrate 202. The BEOL interconnect structure 230 (i.e., BEOL metallization layers 234) is electrically connected to circuit components. For example, the BEOL interconnect structure 230 electrically connects the FET device 210 to other circuits. In some embodiments, the BEOL interconnect structure 230 includes a plurality of dielectric layers 232, and a plurality of metallization layers 234 and aa plurality of via conductors 236 disposed in the dielectric layers 232.

Forming of the BEOL interconnect structure 230 is familiar to those skilled in the BEOL approaches; therefore, such details are omitted in the interest of brevity.

In some embodiments, in the waveguide region 204A, an opening 240 penetrating the dielectric layers 232 of the interconnect structure 230 and the ILD layer 220 is formed. In some embodiments, the optical waveguide structure 100 is disposed in a bottom of the opening 240 and abutting a top surface of the substrate 202. In some embodiments, the optical waveguide structure 100 may be exposed through the opening 240. In some embodiments, the optical waveguide structure 100 may be covered by the CESL 218 or the gate dielectric layer 214a, but the disclosure is not limited thereto. In some embodiments, an optical fiber may be disposed in the opening 240 and abutting to the optical waveguide structure 100, though not shown.

Figure 4:
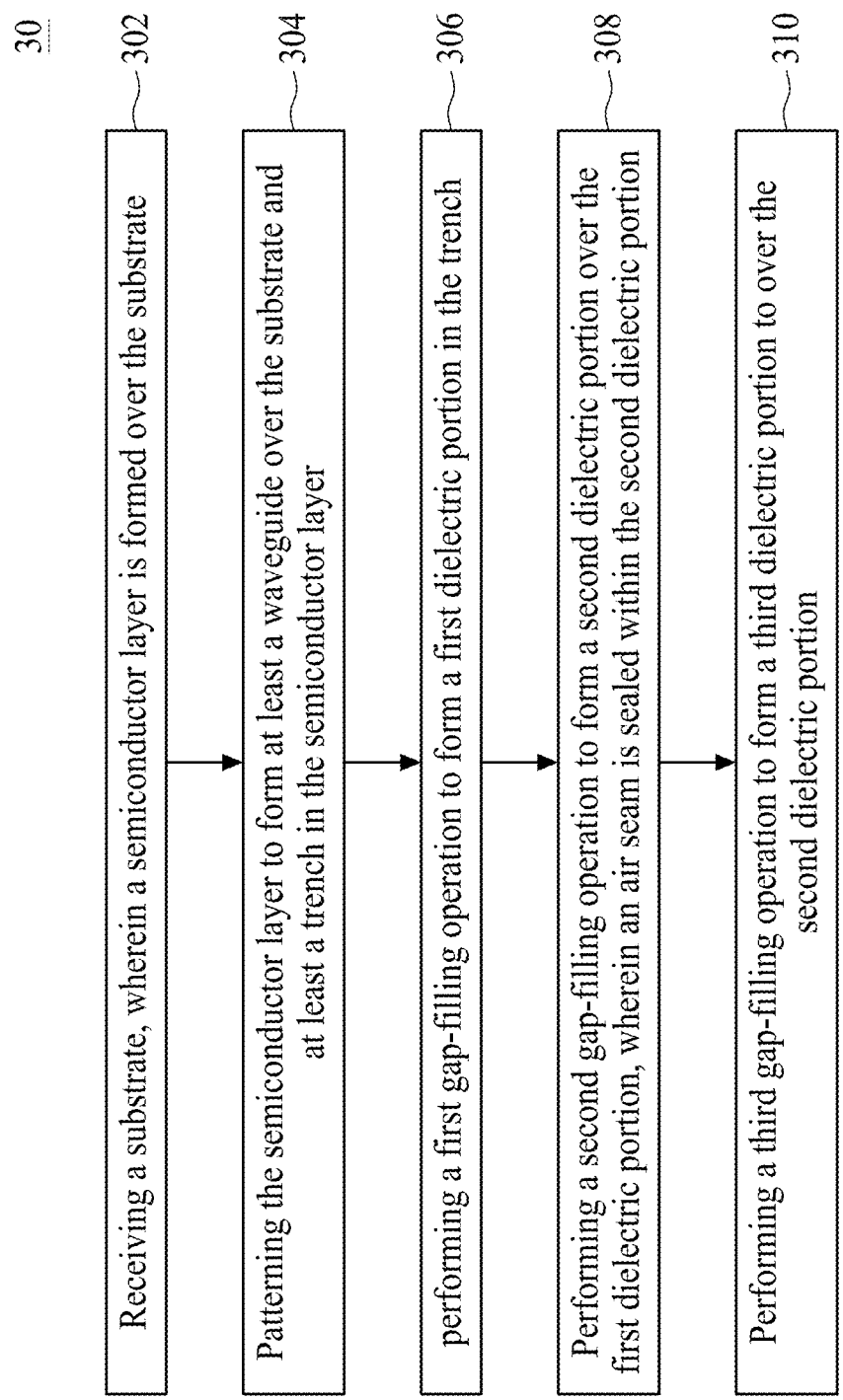
FIG. 4 is flowchart of a method for forming an optical waveguide structure in accordance with some embodiments of the present disclosure.

Please refer to FIG. 4, which is flowchart of a method 30 for forming an optical waveguide structure in accordance with some embodiments of the present disclosure. The method 30 includes a number of operations (302, 304, 306, 308 and 310). The method 30 will be further described according to one or more embodiments. It should be noted that the operations of the method 30 may be rearranged or otherwise modified within the scope of the various aspects. It should further be noted that additional processes may be provided before, during, and after the method 30, and that some other processes may be only briefly described herein. Thus, other implementations are possible within the scope of the various aspects described herein.

In some embodiments, the method for forming an optical waveguide structure 30 includes an operation 302, receiving a substrate. The substrate may include a semiconductor layer formed thereover. The method for forming the optical waveguide structure 30 further includes an operation 304, patterning the semiconductor layer to for at least a waveguide over the substrate and at least a trench in the semiconductor layer. The method for forming the optical waveguide structure 30 further includes an operation 306, performing a first gap-filling operation to form a first dielectric portion in the trench. The method for forming the optical waveguide structure 30 further includes an operation 308, performing a second gap-filling operation to form a second dielectric portion over the first dielectric portion. Further, an air seam is sealed within the second dielectric portion. The method for forming the optical waveguide structure 30 further includes an operation 310, performing a third gap-filling operation to form a third dielectric portion over the second dielectric portion.

Figure 5:
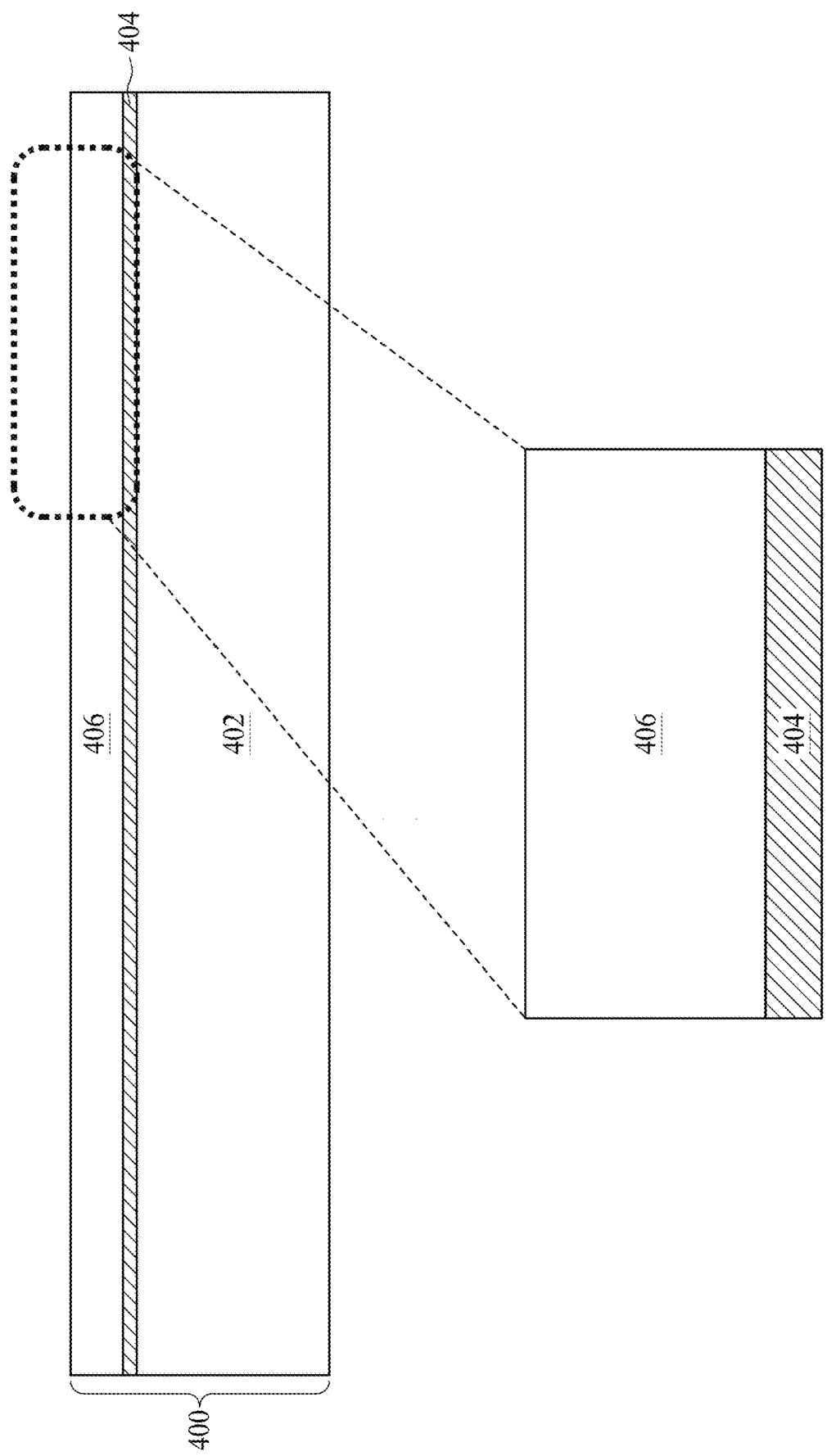
FIG. 5 is a cross-sectional view of an optical waveguide structure at a stage according to aspects of the present disclosure in one or more embodiments.

Please refer to FIG. 5, which is a cross-sectional view of an optical waveguide structure in accordance with some embodiments of the present disclosure. In some embodiments, in operation 302, a substrate 400 is received. The substrate 400 includes a semiconductor bulk 402, an insulator layer 404 over the semiconductor bulk 402, and a semiconductor layer 406 over the insulator layer 404. In some embodiments, the substrate 400 may be a SOI substrate. The SOI substrate may be fabricated using separation by implantation of oxygen (SIMOX), wafer bonding, and/or other suitable methods. The semiconductor bulk 402 may include a silicon bulk, but the disclosure is not limited thereto. The insulator layer 404 may be comprised of any suitable material, including silicon oxide, sapphire, other suitable insulating materials, and/or combinations thereof. An exemplary insulator layer 404 may be a buried oxide layer (BOX). The insulator layer 404 may be formed by any suitable process, such as implantation (e.g., SIMOX), oxidation, deposition, and/or other suitable process. The semiconductor layer 406 may include a silicon layer, but the disclosure is not limited thereto.

Figure 6:
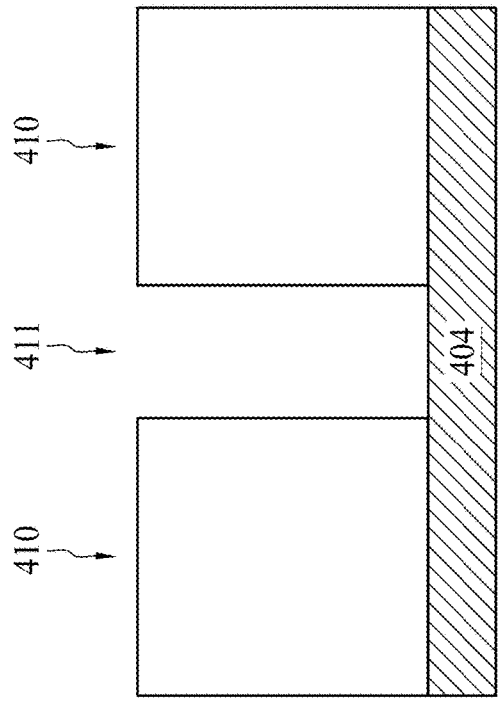
FIGS. 6 to 9 are cross-sectional views of the optical waveguide structure at various stages subsequent to that shown in FIG. 5 according to aspects of the present disclosure in one or more embodiments.

Referring to FIG. 6, in operation 304, the semiconductor layer 406 is patterned to form at least a waveguide 410 in the substrate 400 and at least a trench 411 in the semiconductor layer 406. In some embodiments, the trench 411 may surround the waveguide 410. Widths of the waveguides 410 are equal. In some embodiments, a depth-to-width aspect ratio of the trench 411 is greater than approximately 5. As shown in FIG. 6, sidewalls of the waveguides 410 are referred to as sidewalls of the trench 411. Further, a top surface of the insulator layer 404 is exposed through a bottom of the trench 411. In some embodiments, the width of the trench 411 may define a distance between two adjacent waveguides 410. In some embodiments, the width of the trench 411 is less than the width of the waveguides 410. In some embodiments, the width of the trench 411 is less than approximately 2 micrometers (μm), but the disclosure is not limited thereto.

Figure 7:
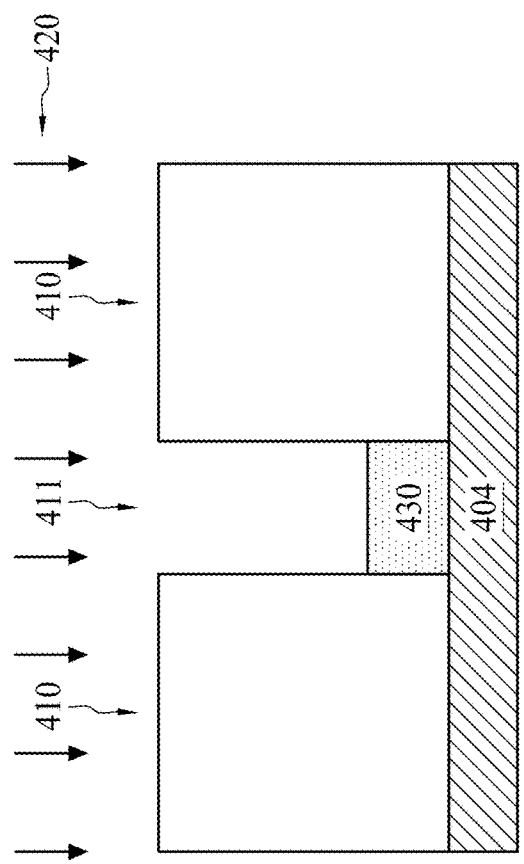

Referring to FIG. 7, in operation 306, a first gap-filling operation 420 is performed to form a first dielectric portion 430 in the trench 411. In some embodiments, the first gap-filling operation 420 includes performing a deposition and a sputtering simultaneously. Further, a deposition/sputter (D/S) rate of the first gap-filling operation 420 is approximately 1. The deposition/sputter rate is an important measure of the gap filling capability. A deposition/sputter rate less than or equal to 1 facilitates the filling of a high-aspect-ratio trench (i.e., greater than 5). For example, the deposition/sputter rate equal to approximately 1 may fill a lower portion of the trench 411 and reveal a substantially flat surface of the first dielectric portion 430, as shown in FIG. 7.

Figure 8:
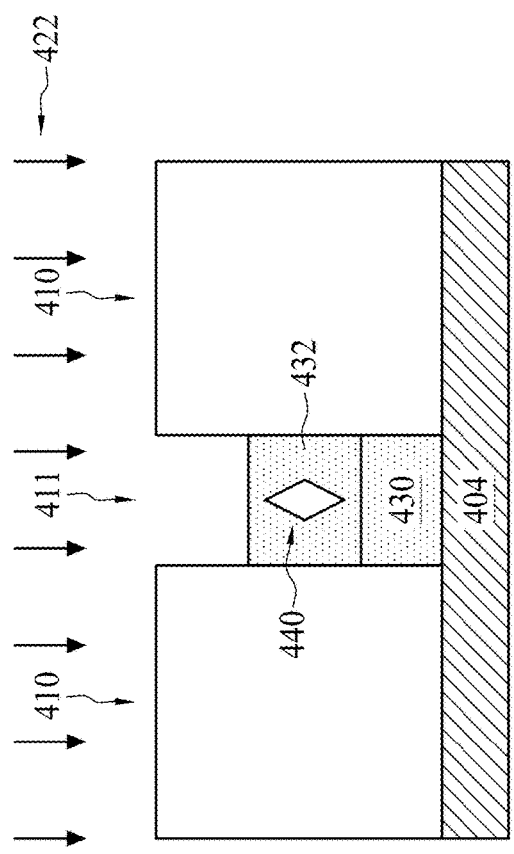

Referring to FIG. 8, in operation 307, a second gap-filling operation 422 is performed to form a second dielectric portion 432 over the first dielectric portion 430 in the trench 411. In some embodiments, the second gap-filling operation 422 also includes performing a deposition and a sputtering simultaneously. Further, a deposition/sputter rate of the second gap-filling operation 422 is between approximately 2 and approximately 10. The relatively high deposition/sputter rate leads to seams and voids sealed within the deposited material. For example, the deposition/sputter rate greater than approximately 2 may form the second dielectric portion 432 in which an air seam 440 is sealed within the second dielectric portion 432, as shown in FIG. 8. In some embodiments, a width of the air seam 440 is less than a width of the second dielectric portion 432 and the width of the trench 411. In some embodiments, a height of the air seam 440 is less than a thickness of the second dielectric portion 432.

Figure 9:
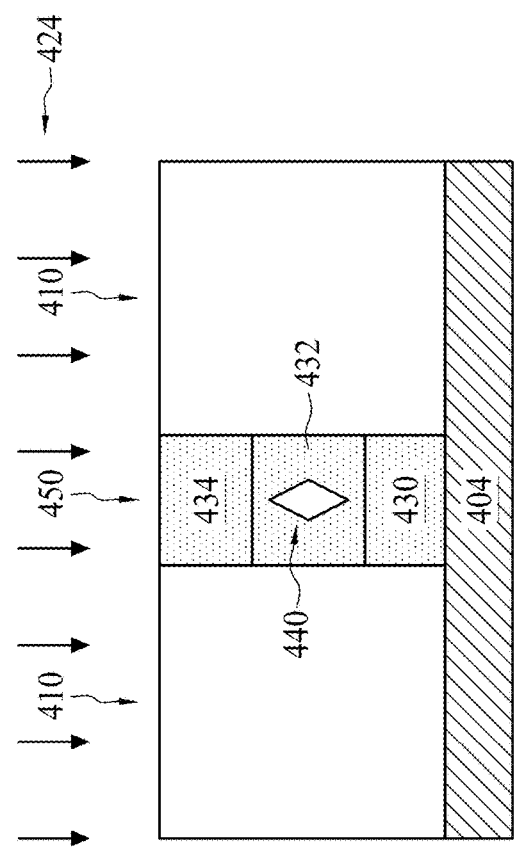

Referring to FIG. 9, in operation 308, a third gap-filling operation 424 is performed to form a third dielectric portion 434 over the second dielectric portion 432 in the trench 411. In some embodiments, the third gap-filling operation 424 includes performing a deposition and a sputtering simultaneously. Further, a deposition/sputter rate of the third gap-filling operation 424 is approximately 1. As mentioned above, the deposition/sputter rate less equal to or less than 1 facilitates the filling of high-aspect-ratio trench (i.e., greater than 5). For example, the deposition/sputter rate equal to approximately 1 may fill an upper portion of the trench 411 and reveal a substantially flat surface of the third dielectric portion 430, as shown in FIG. 9.

In some embodiments, the third gap-filling operation 424 is performed such that the third dielectric portion 434 covers top surfaces of the waveguides 410. In such embodiments, a planarization may be performed to remove superfluous materials and to expose the top surfaces of the waveguides 410. Accordingly, a cladding structure 450 including the first, second and third dielectric portions 430, 432 and 434, and the air seam 440 is obtained. The cladding structure 450 surrounds the waveguide 410. Further, the air seam 440 of the cladding structure 450 provides optical isolation between the waveguides 410.

In some embodiments, a thickness of the first dielectric portion 430, a thickness of the second dielectric portion 432 and a thickness of the third dielectric portion 434 may be similar to each other, but the disclosure is not limited thereto. In such embodiments, the air seam 440 may be formed in a center of the cladding structure 450. A width of the cladding structure 450 may be equal to the width of the trench 411; therefore, the width of the cladding structure 450 defines the distance between the two adjacent waveguides 410. In some embodiments, the width of the cladding structure 450 is less than the width of waveguides 410. It should be noted that the width of the cladding structure 450 is made less than the width of the waveguides 410 due to the air seam 440. In some comparative approaches, when a cladding structure 450 formed without an air seam, the width of the cladding structure 450 is made greater than that of the waveguides 410 in order to reduce noise and power coupling between the waveguides 410.

In some embodiments, a material of the first dielectric portion 430, a material of the second dielectric portion 432 and a material of the third dielectric portion 434 are the same, but the disclosure is not limited thereto.

In some embodiments, the insulator layer 404 is referred to as the first cladding layer 104, and the cladding structure 450 is referred to as the second cladding layer 106 shown in FIG. 2, but the disclosure is not limited thereto. In such embodiments, another dielectric layer may be formed over the waveguides 410 and the cladding structure 450, though not shown. The dielectric layer formed over the waveguides 410 and the cladding structure 450 can be referred to as the third cladding layer 108 shown in FIG. 2, but the disclosure is not limited thereto.

The present disclosure therefore provides an optical waveguide structure that include an air seam/void serving as an optical isolation between adjacent waveguides, thus reducing a spacing distance between adjacent waveguides. In some embodiments, a layout area may be reduced at least 50% due to the air seams. The present disclosure also provides a method for forming a waveguide structure having an air seam between adjacent two waveguides. The method provides operations compatible with CMOS manufacturing operations and provides an ability to conduct post-processing on CMOS wafers containing CMOS imagers or electric circuits.

In some embodiments, an optical waveguide structure of a semiconductor photonic device is provided. The optical waveguide structure includes a first semiconductor waveguide, a second semiconductor waveguide, and an air seam between the first and second semiconductor waveguides.

In some embodiments, an optical waveguide structure of a semiconductor photonic device is provided. The optical waveguide structure includes a plurality of semiconductor waveguides extending in a first direction, and a plurality of air seams extending in a second direction. Each of the air seams is disposed between two adjacent semiconductor waveguides. A distance between the two adjacent semiconductor waveguides is less than a width of each semiconductor waveguide.

In some embodiments, a method for forming an optical waveguide structure is provided. The method includes following operations. A substrate is received. A semiconductor layer is formed on the substrate. The semiconductor layer is patterned to form at least a waveguide in the substrate and at least a trench in the semiconductor layer. A first gap-filling operation is performed to form a first dielectric portion in the trench. A second gap-filling operation is performed to form a second dielectric portion over the first dielectric portion. An air seam is sealed within the second dielectric portion. A third gap-filling operation is performed to form a third dielectric portion over the second dielectric portion.

In some embodiments, a method for forming an optical waveguide structure is provided. The method includes following operations. A plurality of semiconductor waveguides are formed over a substrate. The plurality of semiconductor waveguides are separated from each other by a trench. A first gap-filling operation is performed to form a first dielectric portion in the trench. A second gap-filling operation is performed to form a second dielectric portion over the first dielectric portion. An air seam is sealed within the second dielectric portion. A third gap-filling operation is performed to form a third dielectric portion over the second dielectric portion. A deposition/sputter rate of the second gap-filling operation is greater than a deposition/sputter rate of the first gap-filling operation, and greater than a deposition/sputter rate of the third gap-filling operation.

In some embodiments, a method for forming an optical waveguide structure is provided. The method includes following operations. A substrate is received. A semiconductor layer is formed over the substrate. The semiconductor layer is patterned to form at least one waveguide in the substrate and at least one trench in the semiconductor layer. A cladding structure is formed in the at least one trench. The cladding structure includes an air seam sealed within.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an optical waveguide structure, comprising:
   receiving a substrate, wherein a semiconductor layer is formed over the substrate;
   patterning the semiconductor layer to form at least a waveguide in the substrate and at least a trench in the semiconductor layer;
   performing a first gap-filling operation to form a first dielectric portion in the trench;
   performing a second gap-filling operation to form a second dielectric portion over the first dielectric portion, wherein an air seam is sealed within the second dielectric portion; and
   performing a third gap-filling operation to form a third dielectric portion over the second dielectric portion.

2. The method of claim 1, wherein a deposition/sputter rate of the first gap-filling operation is approximately 1.

3. The method of claim 1, wherein a deposition/sputter rate of the second gap-filling operation is between approximately 2 and approximately 10.

4. The method of claim 1, wherein a deposition/sputter rate of the third gap-filling operation is approximately 1.

5. The method of claim 1, wherein a depth-to-width aspect ratio of the trench is greater than approximately 5.

6. The method of claim 1, wherein the substrate comprise a silicon-on-insulator (SOI) substrate.

7. A method for forming an optical waveguide structure, comprising:
   forming a plurality of semiconductor waveguides separated from each other by a trench over a substrate;
   performing a first gap-filling operation to form a first dielectric portion in the trench;
   performing a second gap-filling operation to form a second dielectric portion over the first dielectric portion, wherein an air seam is sealed within the second dielectric portion; and
   performing a third gap-filling operation to form a third dielectric portion over the second dielectric portion,
   wherein a deposition/sputter rate of the second gap-filling operation is greater than a deposition/sputter rate of the first gap-filling operation, and greater than a deposition/sputter rate of the third gap-filling operation.

8. The method of claim 7, wherein a depth-to-width aspect ratio of the trench is greater than approximately 5.

9. The method of claim 7, wherein the substrate comprise a silicon-on-insulator (SOI) substrate.

10. The method of claim 7, wherein top surfaces of the plurality of semiconductor waveguides are aligned with each other, and bottom surfaces of the semiconductor waveguides are aligned with each other.

11. The method of claim 10, wherein a top surface of the air seam is lower than the top surfaces of the semiconductor waveguides, and a bottom surface of the air seam is higher than the bottom surfaces of the semiconductor waveguides.

12. The method of claim 7, wherein the first dielectric portion, the second dielectric portion and the third dielectric portion comprise a same material.

13. The method of claim 7, wherein a thickness of the first dielectric portion, a thickness of the second dielectric portion and a thickness of the third dielectric portion are similar to each other.

14. A method for forming an optical waveguide structure, comprising:
   receiving a substrate, wherein a semiconductor layer is formed over the substrate;
   patterning the semiconductor layer to form at least one waveguide in the substrate and at least one trench in the semiconductor layer; and
   forming a cladding structure in the least one trench, wherein the cladding structure comprises an air seam sealed within, and the forming of the cladding structure further comprising:
      performing a first gap-filling operation to form a first portion in the trench;
      performing a second gap-filling operation to form a second portion over the first portion, wherein the air seam is sealed within the second portion; and
      performing a third gap-filling operation to form a third portion over the second portion.

15. The method of claim 14, wherein a width of the cladding structure is less than a width of the at least one waveguide.

16. The method of claim 14, wherein a deposition/sputter rate of the second gap-filling operation is greater than a deposition/sputter rate of the first gap-filling operation and a deposition/sputter rate of the third gap-filling operation.

17. The method of claim 14, wherein the first portion, the second portion and the third portion comprise a same dielectric material.

18. The method of claim 14, wherein a length of the at least one waveguide is less than a length of the air seam in the cladding structure from a plane view.

19. The method of claim 14, wherein a width of the air seam in the cladding structure is less than a width of the at least one waveguide from a plane view.

20. The method of claim 14, wherein a height of the at least one waveguide is greater than a height of the air seam from a cross-sectional view.

* * * * *